United States Patent [19]

Homuth

[11] 4,072,434
[45] Feb. 7, 1978

[54] HYDRAULIC CYLINDER WITH CONCENTRICALY MAINTAINED PISTON AND ROD

[76] Inventor: Kenneth C. Homuth, 1885 E. Old Shakopee Road, Bloomington, Minn. 55437

[21] Appl. No.: 761,609

[22] Filed: Jan. 24, 1977

Related U.S. Application Data

[63] Continuation-in-part of Ser. No. 637,362, Dec. 3, 1975, abandoned.

[51] Int. Cl.² ............................................. F16B 9/00
[52] U.S. Cl. .................................... 403/263; 403/253; 403/343
[58] Field of Search ............... 403/242, 253, 254, 263, 403/343; 92/255, 258

[56] References Cited

U.S. PATENT DOCUMENTS

| 3,040,796 | 2/1962 | Gouverneur | 151/7 |
| 3,187,645 | 7/1965 | Cope | 92/258 |
| 3,522,830 | 8/1970 | Blizard | 151/7 |
| 3,652,111 | 3/1972 | Dent | 403/343 X |
| 3,885,461 | 5/1975 | Crisp et al. | 403/259 X |
| 3,914,067 | 10/1975 | Leto | 403/343 X |

*Primary Examiner*—Wayne L. Shedd
*Attorney, Agent, or Firm*—Paul L. Sjoquist

[57] ABSTRACT

A piston rod has a shoulder longitudinally spaced from one end thereof so as to form a stem of reduced cross section for engagement into a piston within a hydraulic cylinder. The stem includes a threaded shank extending from its free end to a male cylindrical pilot spaced from the shoulder by an annular stress-relieving groove. A piston has a threaded central bore portion and counterbore portions at each end, wherein one counterbore portion functions as a female pilot for receiving therein the male pilot in an interference fit relationship, and the other counterbore receives therein a plastic sealing ring which engages the threaded shank of the stem in sealing and centering relationship.

7 Claims, 4 Drawing Figures

HYDRAULIC CYLINDER WITH CONCENTRICALY MAINTAINED PISTON AND ROD

CROSS-REFERENCE TO RELATED APPLICATION

This is a continuation-in-part of U.S. application Ser. No. 637,362, filed Dec. 3, 1975, now abandoned.

BACKGROUND OF THE INVENTION

This invention relates generally to hydraulic cylinders and pistons, and particularly to a hydraulic piston having a piston rod threaded into the piston.

In the operation of any hydraulic cylinder and piston combination very severe mechanical stresses are present, for the hydraulic oil fluid pressures are typically upwards of 3,000 pounds per square inch (p.s.i.), and these pressures are applied across the piston surface in both directions. The piston rod transmits the force resulting from these high hydraulic fluid pressures to a driven member, and the rod is therefore subjected to compressive, tensile, and torquing forces. Unless the piston and rod are formed of one piece or welded together there must be a fluid seal and mechanical stress union between these components in order that they may properly function. Where a threaded connection is employed between the rod and piston, either by means of a piston-retaining nut on the threaded end of the rod or by threading the piston itself onto the rod, a torqued prestressing of this union is normally made in order to prevent premature fatigue failure from the high reversing stresses that are experienced as the piston is hydraulically driven from one direction to the other. The present invention specifically relates to an improvement in hydraulic piston and rod assemblies wherein the connection is made by means of a threaded union.

Normally, the prestressing of the union between piston and rod is achieved by torquing the threaded members against a shoulder to effect a clamp load beyond the expected working stress range, but naturally lower than the initial failure limit of the weaker member. This shoulder is preferably a cross-axis load bearing shoulder between the piston and the rod of an area size sufficient to withstand the forces developed by hydraulic fluid pressure in a first piston direction. In the reverse piston direction the hydraulic fluid pressure forces are contained by the threaded piston/rod union, which threaded union is initially torqued to a prestressed tightness. To the extent that the threaded union is insufficiently tightened, operational failure of the piston and/or rod will be hastened by the reversing hydraulic pressure impact stresses, because any relative movement between these members will cause deformation, fatique and ultimate fracture. I have found that loosening of the threaded rod/piston union is less a result of relative rotation between these members than it is a result of natural self-centering tendencies which exist between the members. A tightened thread occurs between male and female threaded members when the angled thread pressure flanks, normally designed with sufficient clearance for relative rotation between male and female member, are wedged together to cause a mechanical clamp between the members. This process draws and frictionally holds one member off center from the axis of the other member to the extend of the normal diametric thread clearance. However, the high hydraulic pressure forces which reciprocate the piston and rod within the cylinder create working stresses which relieves the friction hold and tends to center the threaded members to a common axis, thereby reducing the prestressed threaded clamp load and allowing the failure process to begin.

The foregoing problem is compounded when larger pistons and rods are used, with their corresponding larger thread sizes. The running clearances required by threaded members are defined in industrial thread fit classes, and these clearances increase with increasing thread diameters, thereby increasing the degree of possible off-axis position of the rod when torqued tightly against the piston. Since the heavy torquing of one member relative to the other can draw the torqued member out of axial alignment with the other member by as much as the diametric clearance between threads, and since the force generated by hydraulic pressure is correspondingly greater with larger pistons, the natural self-centering tendency described above therefore occurs even more readily with larger pistons and rods.

I have discovered that the problem can be eliminated by the proper design of a centering pilot arrangement at either end of the threaded male member on the piston rod, which pilot arrangement holds the piston and rod in axial alignment regardless of the prestressing torque applied in tightening the rod to the piston. This dual piloting mechanism not only resists any rotational tendency that might be present between the rod and piston, but also it prevents any relative lateral motion between them over the entire threaded length of the union. The pretorqued, prestressed union between rod and piston is positively fixed and locked in all planes, creating a sealed mechanical, interference fit "X" bridge between corresponding ends of the threaded rod portion.

In the prior art it has been observed that the self-centering tendency described above, which loosens the piston relative to the rod, requires subsequent retorquing of the rod relative to the piston after work stressing. A number of these retorquings apparently stabilize the clamp load retention and ultimately results in a tight union between the piston and rod. While this is naturally a maintenance nuisance where the hydraulic cylinder is accessible to permit such retorquing, it is an impractical procedure for internal assemblies which necessitate removal of the hydraulic cylinder from its machine and disassembly of the cylinder to gain access to the piston and rod. Therefore most hydraulic cylinder assemblies are not attended to to correct this retorquing need until internal failure of some form takes place.

In the prior art, attempts at maintaining concentricity between parts have been resulted in the design of interfitting conical surfaces which are drawn together by means of some threaded locking mechanism. Such an apparatus is described in U.S. Pat. No. 551,913, issued Dec. 24, 1895, and modified as in U.S. Pat. No. 3,885,461, issued May 27, 1975. However, the use of such conical surfaces for this purpose requires that extremely close machine tolerances be adhered to, and virtually perfect fitting male and female cones be designed. This is difficult to accomplish under average manufacturing conditions and therefore results in very costly components.

Also in the prior art, lock nuts were frequently used to secure a threaded piston rod to a piston, and the pistons themselves have been at times threaded, with the threads usually extending throughout the piston length, to mate with a correspondingly threaded piston rod. Because of the increase in thread length over a piston lock nut, the possibility of the piston becoming loose on the piston rod is somewhat lessened although not eliminated. Resort has been made to various adhesives or bonding agents in an effort to prevent loosening, but the proper amount of bonding material to be used is difficult to achieve in actual practice. If too much bonding agent is applied it becomes exceedingly difficult to remove the piston when it becomes necessary to do so, and if not enough is applied then an imperfect lock is obtained. The curing time required by bonding agents has resulted in an imperfect locking, and hydraulic leakage passed the threads has frequently been encountered as a problem in this approach.

The prior art has approached the problem of sealing against hydraulic fluid leakage between the threaded surfaces in various ways. For example, in U.S. Pat. No. 3,187,645, issued June 8, 1965, a jam ring is compressibly tightened against the piston outer surface and deformed into engagement with the piston rod threads. This approach requires extremely high compression forces and a number of different components and uncertain assembly operations in order to be functional. Prior art devices have used relatively soft O-rings whose performance is dependent upon satisfactory control of the extrusion gaps adjacent the O-rings, for the hydraulic fluid pressure internal the cylinder generates large extrusion forces. These forces can easily deform poorly fitting O-rings and thereby destroy their sealing functions.

SUMMARY OF THE INVENTION

The present invention accomplishes three desired results: that of locking a threaded piston rod to a piston, centering the piston rod relative to the piston axis in fixed immovable relationship, and sealing the thread gap between piston and rod from hydraulic fluid leakage. The invention accomplishes its intended purpose through the use of only a single component in addition to the piston and rod itself, and enables the use of relatively nonprecision manufacturing techniques for its accomplishment.

The invention comprises a piston rod having a shoulder thereon and a threaded, reduced diameter stem extending therefrom, and an internally threaded piston having a counterbore at each end, and having a deformable ring, preferably made from nylon, sized to fit in one piston counterbore engageable against the threaded stem of the piston rod. Between the piston rod shoulder and the stem threaded portion is constructed a cylindrical pilot which is interference fit into the other piston counterbore, so that when the rod is threaded through the piston and deformable ring and pretorqued into tightened engagement, a piston and rod assembly is created which is sealed from hydraulic fluid leakage, locked together into a unitary assembly, and centered on the piston axis.

The foregoing construction accomplishes the primary object of the present invention, which is to provide a hydraulic cylinder possessing a high degree of reliability so that it can be effectively employed in virtually any type of fluid transmission system utilizing a hydraulic cylinder. It further accomplishes the object of providing a hydraulic cylinder in which true thread concentricity between the piston and rod is initially provided and maintained for prolonged periods without attention, thereby increasing the service life of the assembly. A further object which is accomplished by the present invention is to provide a pilot interference fit at one end of the piston which assures a true axial alignment with the piston rod, without the use of conical engaging surfaces, and to provide a locking arrangement at the other end of the piston that not only resists rotation of the piston relative to the piston rod but which additionally assists in maintaining concentricity. Further, the invention provides a locking arrangement which provides a static pressure seal between the piston and piston rod to prevent leakage of hydraulic fluid.

Further objects which the present invention accomplishes include the providing of a piston which can be easily threaded onto a piston rod initially, and thereafter be retained thereon without resort to pins, welds, adhesives and the like. In addition, an object is accomplished of removing and eliminating the piston retaining nut which is common in the prior art, the elimination thereof resulting in a simpler construction and also enabling the effective stroke of the piston to be increased without increasing the length of the hydraulic cylinder.

BRIEF DESCRIPTION OF THE DRAWINGS

A preferred embodiment of the invention is described hereinafter, and with reference to the drawings, in which:

FIG. 3 shows a greatly expanded fragmentary sectional view of a portion of the piston rod and piston and deformable ring in partial threaded engagement.

DESCRIPTION OF THE PREFERRED EMBODIMENT

Figure 1:
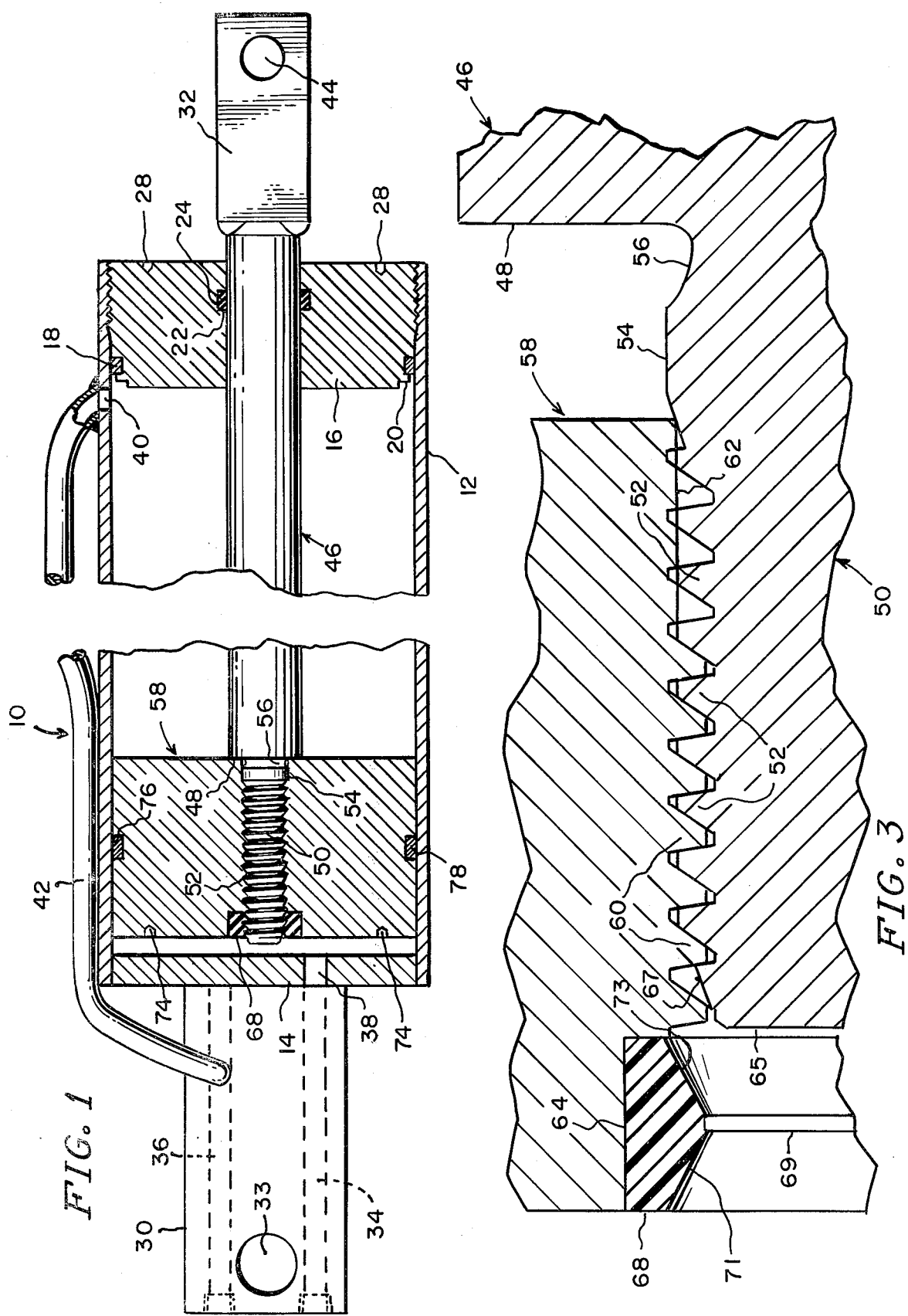
FIG. 1 is a longitudinal sectional view of a hydraulic cylinder constructed in accordance with the teachings of the invention, a central portion of the hydraulic cylinder having been removed in order to permit a larger scale to be employed.

Although hydraulic cylinders have heretofore been in widespread use for various purposes, such as those uses hereinbefore mentioned, it will be helpful to refer first to those parts of the hydraulic cylinder denoted generally by the reference numeral 10 in FIG. 1 that are conventional. Accordingly, the hydraulic cylinder 10 comprises a cylindrical casing 12, a head 14 at the left or closed end that is welded in place, and wherein a major longitudinal portion of the casing 12 has been removed from the center in FIG. 1 in order to permit use of a larger drawing scale. Since the head 14 is fixedly attached to the casing 12, no seals other than that resulting from the welding are needed.

However at the other end of the casing 12, the situation is different. More specifically, a head 16 is threadably and removably engaged within the end of the casing 12. To prevent leakage past the threads, a static resilient O-ring is employed, there being an annular groove 20 in which the ring 18 is confined. Also, the head 16 is internally grooved at 22 so as to accommodate a second resilient O-ring 24. Inasmuch as the head 16 is intended to be removed, a plurality of spanner wrench holes 28 are provided at the outer face thereof.

Although not constituting part of the invention, lugs 30 and 32 are affixed at opposite ends of the hydraulic cylinder 10. The lug 30 at the left end has a width or thickness such that it can be received in a clevis (not shown) constituting part of the apparatus or equipment with which the hydraulic cylinder 10 is used. In this regard, it will be observed that a transverse mounting hole 33 is provided which accommodates therein a connecting pin (not shown) that extends through the clevis.

While also not limited to this arrangement, the lug 30 is provided with two passages 34, 36. In this regard, it will be discerned that the passage 34 has direct communication with an "extend" port 38 in the head 14, whereas the passage 36 has communication with a "retract" port 40 in the casing 12, a tube 42 connecting the passage 38 with the retract port 40. Whereas the lug 30 effects connection of the closed end of the hydraulic cylinder 10 to an appropriate member associated with the device or equipment to be actuated, the lug 32 at the other end also has a hole therein which has been labeled 44 for accommodating a pin that passes therethrough and also a second clevis (not shown) belonging to the device or equipment to be controlled.

Describing now the parts of the hydraulic cylinder 10 with which the invention is concerned, there is a steel piston rod 46, the lug 32 being welded to the projecting end of the piston rod 46. The piston rod 46 has a shoulder 48 spaced longitudinally from the end thereof that is contained within the cylindrical casing 12. Extending longitudinally from the shoulder 48 is a reduced diameter stem 50. In this regard, it will be observed that the major portion of the stem 50 is threaded, the threads being identified by the reference numeral 52. Between the threaded portion 52 and the shoulder 48 is a male cylindrical pilot portion 54 and between the pilot 54 and the shoulder 48 is a necked down section or annular groove 56, the groove 56 relieving certain stresses that would otherwise develop during assembly and service operation of the hydraulic cylinder.

Attention is directed to an aluminum piston designated generally by the reference numeral 58. The piston 58 is formed with a threaded bore, the threaded bore having been given the reference numeral 60. It is important to note that one end of the piston 58 has a counterbore 62 which functions as a female pilot portion. From FIG. 3, as greatly exaggerated, it will be seen that the counterbore or female pilot 62 has an internal diameter less than the outer diameter of the male pilot 54. More specifically, an interference fit of from 0.002 to 0.008 inch is employed. The axial length of the male pilot 54 can be less when the interference fit it toward the high end of the range, and greater when toward the lower end of the range. In other words, the longer the pilot 54, the less interference is required.

At the other end of the piston 58 is a second counterbore 64. The purpose of the second counterbore 64 is to receive therein a deformable ring 68, preferably of a material such as nylon, although metallic rings of hardness less than stem 50 are also possible. The deformable ring 68 is in the form of a sleeve of sufficient diameter so as to produce a press fit when inserted in the counterbore 64, but as the threads 52 on the stem 50 are advanced therethrough, the accompanying compression deforms the ring 68 so that some of the ring material "flows" into the helical grooves between the threads 52 to securely anchor the ring 68 in the counterbore 64.

Ring 68 and stem 50, with its threaded portion 52, are mutually sized to permit the threaded portion 52 of stem 50 to self-tap through the inner diameter of ring 68. Ring 68 is therefore constructed so as to have a center circumferential rib 69 at a dimension which creates a ring internal minor diameter, and an outwardly extending beveled portion 71 and 73 which create a ring internal major diameter. The ring internal major and minor diameters are selected in particular relationship to the major and minor diameters of threads 52. In addition, the leading threads 52 have a taper 67 which is formed according to particular dimensional tolerances. Rib 69 has a diameter less than the major thread 52 diameter but greater than the minor thread 52 diameter, i.e. the thread root diameter. The taper 67 across the leading thread 52 is formed to create a diameter at the extreme end 65 of stem 50 less than the diameter of rib 69. This allows the leading edge of stem 50 to pass through rib 69 when the piston rod is threaded into piston 58. As threading continues taper 67 exposes a widening thread diameter to ring 68, and at some point a thread/ring contact is made wherein one of the threads 52 contacts beveled surface 71 to start the self-tapping action. Thereafter rib 69 holds ring 68 in position between the valleys of threads 52 and prevents continuing threaded motion from ejecting ring 68 from counterbore 64. Since the included angle between beveled surfaces 71 and 73 is greater than the angle of the respective thread 52 valleys, the threads 52 will bite into the deformable ring 68 and cause the inner ring material to "flow" into the thread valleys and create a tight fluid seal along a portion of the threaded ring/stem engagement. In addition, threads 52 exert an outward radial force against ring 68 to increase the force of its compression fit in counterbore 64. As a result, the contact area forces around counterbore 64 exert a friction-holding force against ring 68 which exceeds the torquing forces of threads 52 as they are tapped through the inner diameter of ring 68, which causes the ring to remain locked in a fixed position within counterbore 64 during the self-tapping action.

The threaded engagement of ring 68 against stem 50 retains ring 68 while under hydraulic pressure forces in the assembled cylinder.

From the foregoing, it is evident that one purpose of deformable ring 68 is to resist relative rotation between piston 58 and stem 50. This is accomplished by the self-locking compressive action against the threads 52 on stem 50 as the stem nears its fully engaged or mated relationship with piston 58. In other words, there is an interference between ring 68 and the stem 50 in the area of counterbore 64. In addition to resisting rotation of piston 58 on the stem 50, another purpose is to provide a static pressure seal between the piston 58 and stem 50. Still further, ring 68 maintains concentricity at the lead end of stem 50, resisting any forces tending to rock piston 58 with respect to the stem 50 and hence relative to rod 46.

As fas as the resistance to rotation supplied by the deformable ring 68 is concerned, it will be appreciated that this is in addition to the resistance provided by threads 52, 60 and the interference fit provided by the male and female pilots 54, 62.

To permit piston 58 to be threaded onto stem 50, spanner wrench holes 74 are provided on the face of piston 58.

Figure 2:
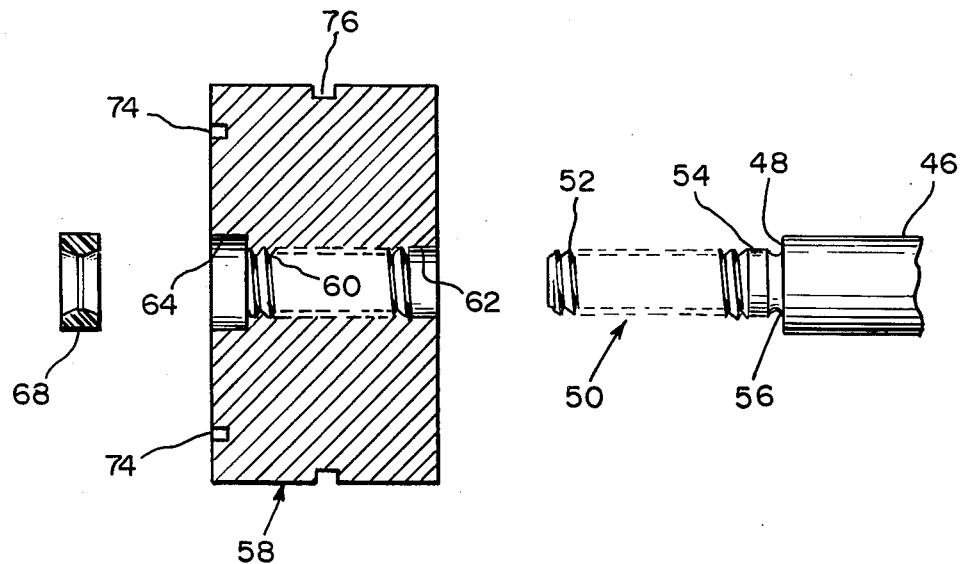
FIG. 2 is an exploded view showing one end of the piston rod, the piston, and the deformable ring, in partial sectional view, the parts having been depicted in a separated relationship in order to illustrate to better advantage the configuration prior to assembly.
Figure 4:
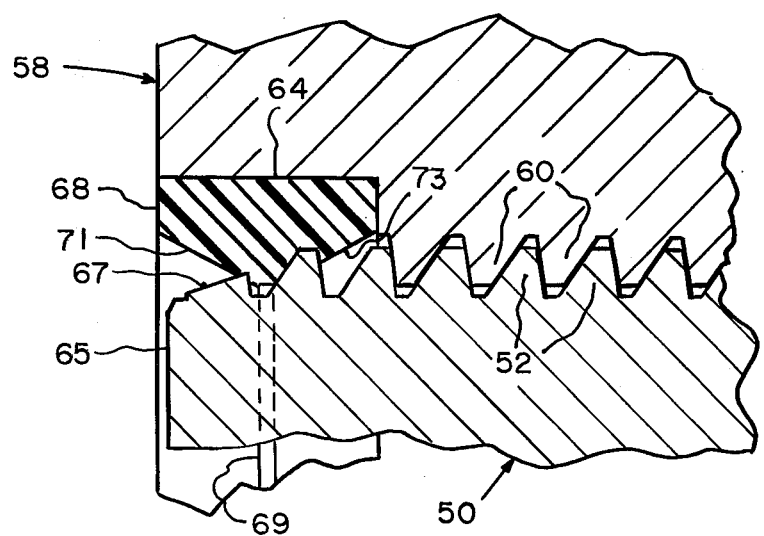
FIG. 4 shows a greatly expanded fragmentary sectional view of a portion of the piston rod, piston and deformable ring in further threaded position.

Although the manner in which piston 58 is attached or connected to rod 46 should be readily apparent from the foregoing, it will be understood that rod 46, piston 58 and deformable ring 68 are initially in the general relation appearing in FIG. 2. First, deformable ring 68 is pressed into counterbore 64, the ring 68 being sufficiently larger in diameter than the counterbore 64 so that a tight fit results. The piston rod 46, more specifically its stem 50, is then advanced in the direction of the piston 58 and rotation of the piston 58 relative to stem 50 by means of a spanner wrench fitted into the holes 74 results in a continued relative advancement of the stem threads 52 with respect to the piston threads 60. It will be understood that the head 16 is first slid onto the piston rod 46 and remains in an encircled relationship for later threaded engagement with the casing 12. When the end of the stem 50 reaches the deformable ring 68, as illustrated in FIG. 4, which ring has already been pressed into counterbore 64, the threads 52 act to deform the material of ring 68 according to the proceeding description, forcing the displaced material inwardly into the roots of the grooves between threads 52.

Full mating of the piston 58 onto the stem 50 of the piston rod 46 results in a crowding of the metal circumjacent the counterbore 62 or female pilot of the piston 58 into the groove 56 adjacent male pilot portion 54. Any material that is forced toward the shoulder 48 is accommodated in the groove 56 which acts as a stress relieving means. Consequently, the greatest possible surface area of the shoulder 48 abuts the right face of piston 58. By virtue of the interference fit between the pilot 54 and 62, the piston 58 is maintained in a truly concentric relation on the stem 50. Since the deformable ring 68 maintains stem 50 in a truly concentric relationship at its leading end, and since pilots 54 and 62 maintain concentricity on the stem inner end, perfect concentricity is assured for the piston rod 46 relative to piston 58. Further, relative rotation of piston 58 relative to piston rod 46 is prevented through the combination of the forementioned locking arrangements. Still further, the deformation of ring 68 into threads 52 provides an effective static seal preventing fluid flow between the threads 52 and 60. The invention thereby provides all of the advantages desired for an apparatus of this type though the use of only a single additional inexpensive part, beyond the piston and rod combination. The dual piloting, dual locking, sealing action is simultaneously accomplished by the simple torquing of the piston and rod together.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a hydraulic cylinder of the type having a piston and rod threadably attached, the improvement comprising
   a. a shoulder on said rod abutting against a first piston surface and a threaded stem extending from said shoulder in threaded engagement through said piston;
   b. a counterbore in a second piston surface axially aligned with the piston threaded stem engagement portion; and
   c. a deformable ring sized for interference fit into said counterbore and having a narrowed inner circumference comprising a circumferential rib of minimum width less than the thread pitch of said threaded stem, and sized for self-tapping engagement with said threaded stem.

2. The apparatus of claim 1, wherein said circumferential rib further comprises an expanding taper which has a maximum width greater than the thread pitch of said threaded stem.

3. In a hydraulic cylinder of the type having a piston and rod threadably attached, the improvement comprising:
   a. a first counterbore in one piston end axially aligned with the piston threaded portion, and a second counterbore in the other piston end axially aligned with the piston threaded portion;
   b. a threaded rod stem of reduced diameter relative to said rod diameter to form a rod shoulder at the juncture of the stem with the enlarged rod diameter, and having a cylindrical pilot portion sized for interference fit into said first counterbore, on said stem adjacent said shoulder, the lead threads on said stem being formed to a conical taper; and
   c. a deformable ring sized for interference fit into said second counterbore and having an inner diameter less than the stem diameter and greater than the stem minor thread diameter, said inner diameter comprising an interior rib sized for fitting between respective threads of said stem.

4. The apparatus of claim 3, further comprising a region of reduced diameter on said stem between said cylindrical pilot portion and said shoulder.

5. In the combination of a hydraulic cylinder, piston and piston rod wherein the rod is threadably attached to the piston, the improvement comprising:
   a. a shoulder on said rod facing against said piston;
   b. a first and second counterbore in said piston surfaces axially aligned with the piston threaded portion;
   c. a threaded stem on said rod for engaging said piston threaded portion, said threaded stem having threads with a minimum root diameter and a maximum thread diameter, and a cylindrical pilot portion on said rod between said threaded stem and said shoulder, said cylindrical pilot sized for interference fit into said first piston counterbore; and
   d. a deformable ring having an outer diameter sized for interference fit into said second piston counterbore, and having an inner circumferential rib with a diameter sized between said stem threads' minimum and maximum diameters, said rib having a width at its minimum diameter point less than the distance between adjacent stem threads.

6. The apparatus of claim 5, wherein said deformable ring is made from nylon.

7. The apparatus of claim 6, further comprising an annular groove on said stem between said shoulder and said cylindrical pilot.

* * * * *